(12) United States Patent
Satyanarayanan (10) Patent No.: US 6,510,504 B2
(45) Date of Patent: *Jan. 21, 2003

(54) METHODS AND APPARATUS FOR MEMORY ALLOCATION FOR OBJECT INSTANCES IN AN OBJECT-ORIENTED SOFTWARE ENVIRONMENT

(75) Inventor: Raju Satyanarayanan, Union City, CA (US)

(73) Assignee: Oracle Corporation, Redwood Shores, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/106,652

(22) Filed: Jun. 29, 1998

(65) Prior Publication Data

US 2001/0056522 A1 Dec. 27, 2001

(51) Int. Cl.[7] .............................................. G06F 12/02
(52) U.S. Cl. ........................ 711/170; 709/310; 711/171; 707/205; 707/206
(58) Field of Search ........................ 711/170–172, 153; 709/310–332, 315–316, 317, 205–206; 707/103, 205–206

(56) References Cited

U.S. PATENT DOCUMENTS

| 5,109,336 A | 4/1992 | Guenther et al. ............ 395/425 |
| 5,561,786 A | 10/1996 | Morse .................... 395/497.01 |
| 5,577,243 A | 11/1996 | Sherwood et al. ........... 395/607 |
| 5,784,699 A | 7/1998 | McMahon et al. ........... 711/171 |
| 5,809,554 A | * 9/1998 | Benayon et al. ............ 711/171 |
| 5,930,807 A | * 7/1999 | Ebrahim et al. ............ 707/206 |
| 6,003,039 A | * 12/1999 | Barry et al. ................ 707/103 |
| 6,125,434 A | * 9/2000 | Willard et al. ............. 711/170 |
| 6,154,823 A | * 11/2000 | Benayon et al. ............ 711/171 |
| 6,275,916 B1 | * 8/2001 | Weldon, Jr. et al. ......... 711/170 |

OTHER PUBLICATIONS

Que Corporation, Active X Programming with Visual C++ 5, pages, 16, 420, 461, 463, and 465, 1997.*

* cited by examiner

Primary Examiner—Matthew Kim
Assistant Examiner—Denise Tran
(74) Attorney, Agent, or Firm—Stattler, Johansen & Adeli, LLP (57) ABSTRACT

An object instance memory allocation module allocates blocks of memory in an object oriented software system. An object instance pool is generated for each object class configured as a reusable class. The object instance pool contains a plurality of entries, and each entry is associated with an object instance memory block configured to store an object instance for the object class. When an object instance is instantiated from an object class, the object instance memory allocation technique allocates, from an entry of the object instance pool, a memory block if one of the memory blocks are available. When an object instance is released (i.e., deleted), the object instance memory allocation technique re-assigns memory blocks for the object class into an entry of the object instance pool. An object oriented software environment that implements the object instance memory allocation techniques is also disclosed.

17 Claims, 6 Drawing Sheets

METHODS AND APPARATUS FOR MEMORY ALLOCATION FOR OBJECT INSTANCES IN AN OBJECT-ORIENTED SOFTWARE ENVIRONMENT

BACKGROUND OF THE INVENTION

1. Field of the Invention

The present invention is directed toward the field of object oriented software systems, and more particularly to memory allocation of instances of objects.

2. Art Background

An object oriented approach to programming provides many advantages over traditional procedural programming approaches. For example, an object oriented approach permits code reuse through inheritance and modularity through encapsulation. There are many views as to what concepts define object oriented programming, and there are many terms and definitions for defining these concepts. In general, objects incorporate procedures, also called methods or operations, and data, also called attributes or properties. Objects are instantiated from and described by structures known as classes or types. A type or class is a general abstract specification, and an object instantiated from a type is a specific concrete instance of the type.

A type consists of an interface and an implementation. The interface comprises variables and function declarations, wherein the variables represent the attributes of the type, and the function declarations specify methods for manipulating those attributes as well as performing other operations. The declaration specifies the name, return type, and argument, known collectively as the signature. The implementation refers to the actual code that implements the methods specified in the interface. Types may consist of abstract types or implementation types. Objects are not instantiated from abstract types. Instead, objects are instantiated from an implementation type.

In general, objects communicate through message passing mechanisms. An object, known as a client object, may call a method of another object. A client object invokes a method of another object by accessing the object via the defined interfaces. Thus, to invoke a method in an object or to query an object, the client object requires knowledge of the signatures of the methods in the interface of the target object. The client object calls the methods and passes the appropriate parameters. For example, to obtain the value of an attribute in an object, a client object calls a method, via an interface, to obtain the value.

Object instances, instantiated from implementation types or classes, are used for the execution of programs. Many instances of an object may be instantiated from an implementation type during execution of a program. The creation and deletion of object instances during program execution is referred to as "object life cycle." Object life cycle management becomes very complex in large programs because thousands of object instances may be created and deleted throughout the execution of the program.

Object life cycle management includes requesting memory blocks to create object instances, and relinquishing memory blocks to delete object instances. Specifically, for each instance of an object created, memory is allocated for that instance. At the end of the object's life cycle, the object instance is deleted, and its memory block is released or freed for subsequent reuse. The generation of an object instance thus requires using memory management resources for allocation of a memory block to store the object instance in system memory. Similarly, the deletion of an object instance consumes memory management resources by requiring re-allocation of memory freed as a result of deleting the object instance. Thus, effective object life cycle management should include some form of memory management to efficiently manage memory allocation during creation and deletion of object instances.

In general, memory management includes dynamic allocation of memory resources to software programs resident in the computer system memory. Typically, dynamic memory management consists of allocating sections of memory, in response to requests from the software programs, and managing free memory blocks. Dynamic allocation of memory, or dynamic memory, is memory requested by software programs during operation of the software programs. Typically, software programs require low level routines for management of dynamic memory. Dynamic memory allocation is typically required because an application program cannot be pre-configured with memory that fulfills all possible run time requirements of the application. For example, the number of object instances for any object is not known prior to execution of the program. Thus, statically allocating all memory requirements for each object instance is not possible nor efficient. As part of the object's life cycle, object instances are deleted after they are no longer needed in the program. However, it is difficult to ascertain the end of the life cycle for an object instance, and thus determine when memory for the object instance may be available for system memory use.

As discussed above, many object instances may be instantiated from a single implementation type or class during execution of a software program. In fact, for a commonly used object, such as a text buffer object used to temporarily store text strings, hundreds or even thousands of instances of the object may be generated during execution of a program. For the text buffer object example, many objects in a program may instantiate instances of the text buffer object, for use as a temporary buffer, and then shortly thereafter delete the instance when the buffer is no longer needed. For this example, thousands of object instances may be instantiated, and shortly thereafter deleted. Accordingly, for the text buffer object example, a significant amount of memory management resources may be consumed to create and delete the object instances. Thus, it is desirable to minimize the amount of memory management resources used in object life cycle management to enhance overall system performance.

SUMMARY OF THE INVENTION

An object instance memory allocation module allocates blocks of memory in an object oriented software system. The object instance memory allocation module includes an object instance pool for each reusable object class. The object instance pool contains a plurality of entries, and each entry is associated with a memory block configured to store an object instance for the object class. When an object instance is instantiated from an object class, the object instance memory allocation module allocates, from an entry of the object instance pool, a memory block if one of the memory blocks are available. When an object instance is released (i.e., deleted), the object instance memory allocation module re-assigns memory blocks for the object class into an entry of the object instance pool.

DETAILED DESCRIPTION

Object Instance Memory Allocation Overview

Figure 1:
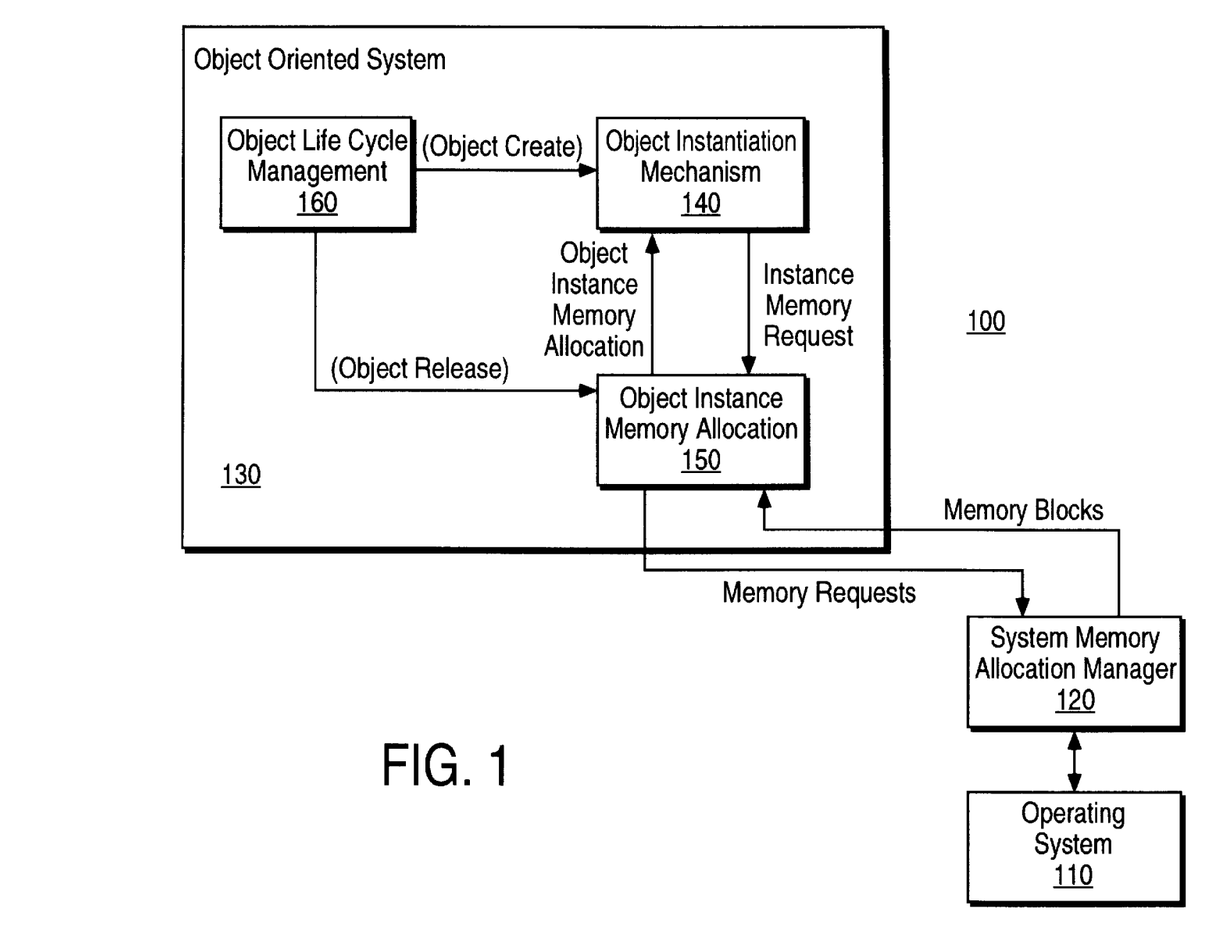
FIG. 1 is a high level block diagram illustrating one embodiment for a software system that incorporates object instance memory allocation.

FIG. 1 is a high level block diagram illustrating one embodiment for a software system that incorporates object instance memory allocation. A software system 100 operates on a general purpose computer, such as the general purpose computer illustrated in FIG. 6. The software system 100 includes an operating system 110 for controlling the general operation of the computer system including permitting execution of application programs. The operating system 110 includes a mechanism for allocating large blocks of system memory for use by software programs operating as part of the software system 100.

Figure 5:
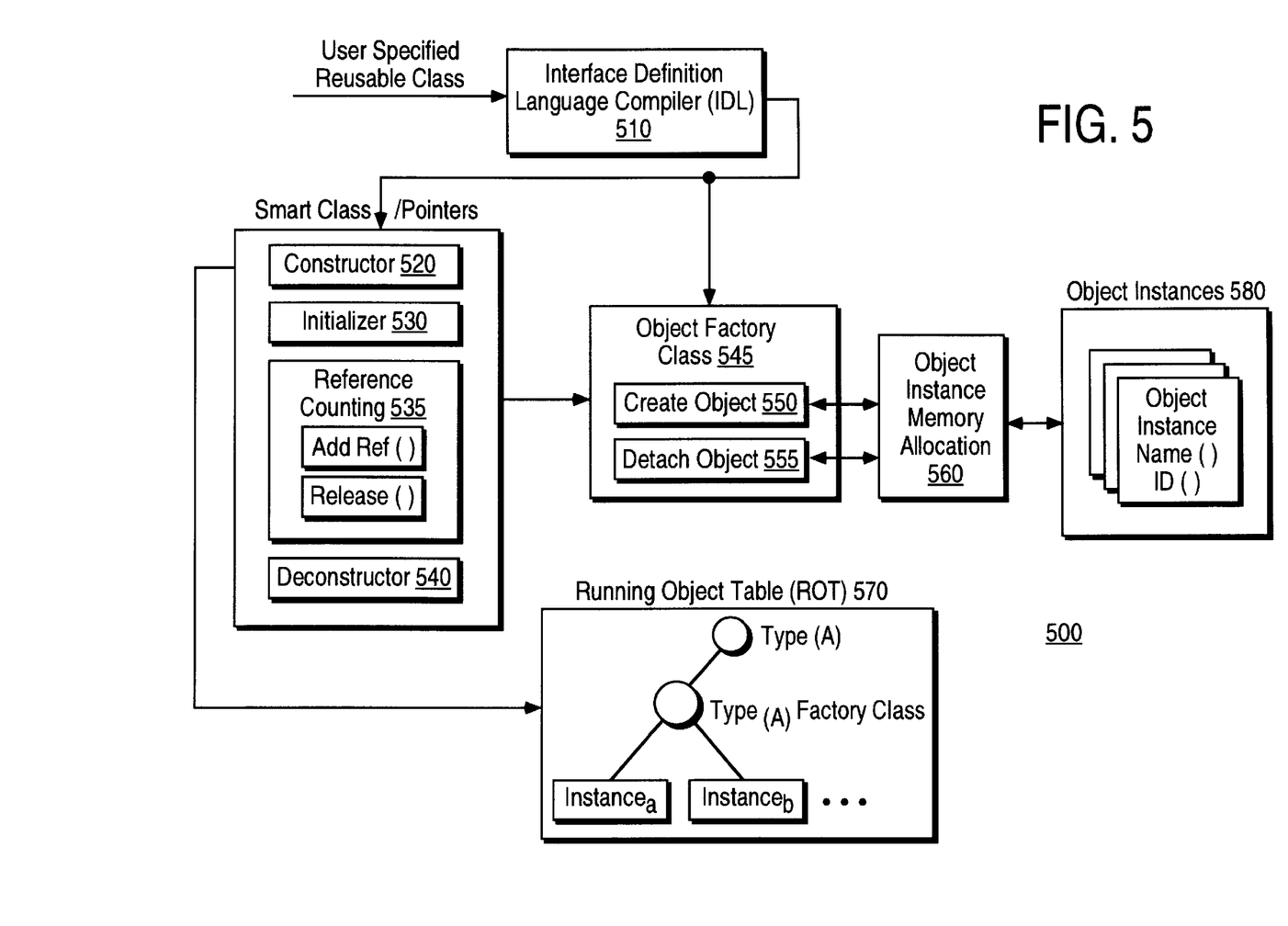
FIG. 5 is a block diagram illustrating a portion of a distributed object oriented software environment.

For this embodiment, the software system 100 includes an object oriented software system 130. In general, the object oriented software system 130 permits execution and development of object oriented software, such as software developed using the C++ and/or Java programming languages. A portion of a distributed object oriented development environment is shown in FIG. 5. For purposes of simplicity, the object oriented software system 130 only includes those subsystems used in the object life cycle management process. Specifically, object oriented software system 130 includes object instantiation module 140, object life cycle management module 160, and object instance memory allocation 150. In general, the object instantiation mechanism 140 generates object instances from an underlying implementation type or class. In one embodiment, object instantiation mechanism 140 comprises a plurality of object factories, one for each object type implemented in the software system 100. Object life cycle management 160 controls and manages the creation and deletion of objects in accordance with a predetermined object life cycle policy. Object life cycle management 160 controls generation and deletion of object instances, as indicated by the notion "object creation" input to object instantiation mechanism 140 and the notation "object release" input to object instance memory allocation 150, respectively. In one embodiment, the object life cycle management 160 includes a "garbage collection" mechanism that determines when existing object instances are no longer required.

The object instance memory allocation 150 allocates memory for object instances. Specifically, for the embodiment shown in FIG. 1, the object instance memory allocation 150 receives instance memory requests from the object instantiation mechanism 140, and manages memory allocation for those object instances. Also, as shown in FIG. 1, the object instance memory allocation 150 receives "object release" information from the object life cycle management 160, to either release or re-allocate memory resources for an object instance.

In one embodiment, the object instance memory allocation 150 operates with a system memory allocation manager 120 as shown in FIG. 1. Alternatively, the object instance memory allocation 150 may directly operate with a heap manager, which is part of the operating system 110, to receive large blocks of system memory for management and allocation. In general, to interface with the system memory manager 120, the object instance memory allocation 150 generates memory requests, for memory blocks, and in response, receives memory blocks sufficient to fulfill the requirement of the memory request. For the embodiment shown in FIG. 1, the system memory allocation manager 120 manages memory blocks, both large and small, in accordance with a predetermined memory management policy. Memory management policies, for use with a dynamic memory manager, are well known in the art and will not be described further.

The following example illustrates the problem encountered when allocating memory for object instances for an object widely used in a program. A data text object provides a temporary buffer to store text strings up to an arbitrary length (e.g., 40 k bytes). A test, which monitored the number of object instances instantiated for the data text object, indicated that 40,000 object instances for the data text object were created and released during operation of this test program. This includes all object instances created and released throughout operation of the entire program. However, the test indicated that at any one point in time no more than twenty (20) object instances were active (i.e., object instances resident in system memory). Without the object instance memory allocation 150 (FIG. 1), each of the 40,000 object instances would require a request from either the operating system or a dynamic memory allocator for memory allocation for each object instance. In addition, significant overhead is incurred by requesting memory release operations to release memory blocks associated with the 40,000 object instances. As is described fully below, the object instance memory allocation of the present invention utilizes the fact that only a relatively small number of object instances are active during any point in time. The object instance memory allocation of the present invention reduces the amount of memory requests to either a dynamic memory allocator or the operating system, thus reducing overhead and increasing performance.

In general, the object instance memory allocation 150 (FIG. 1) includes a pool of object instances for an object class. The object oriented software system 130 provides a mechanism to specify object classes as "reusable classes." In one embodiment, a user (e.g., program developer) specifies a number of entries for the object instance pool for the corresponding reusable object class. When objects are instantiated (object instantiation mechanism 140), an object instance entry from the pool is allocated, if possible, to fulfill the object instance memory request. When an object instance is released (object life cycle management 160), the memory is reallocated into the object instance memory pool for the corresponding object class. Because the memory for the object instances is not relinquished to either a dynamic memory allocator or operating system, overhead is not incurred to allocate memory for each object instance created and subsequently released.

Figure 2:
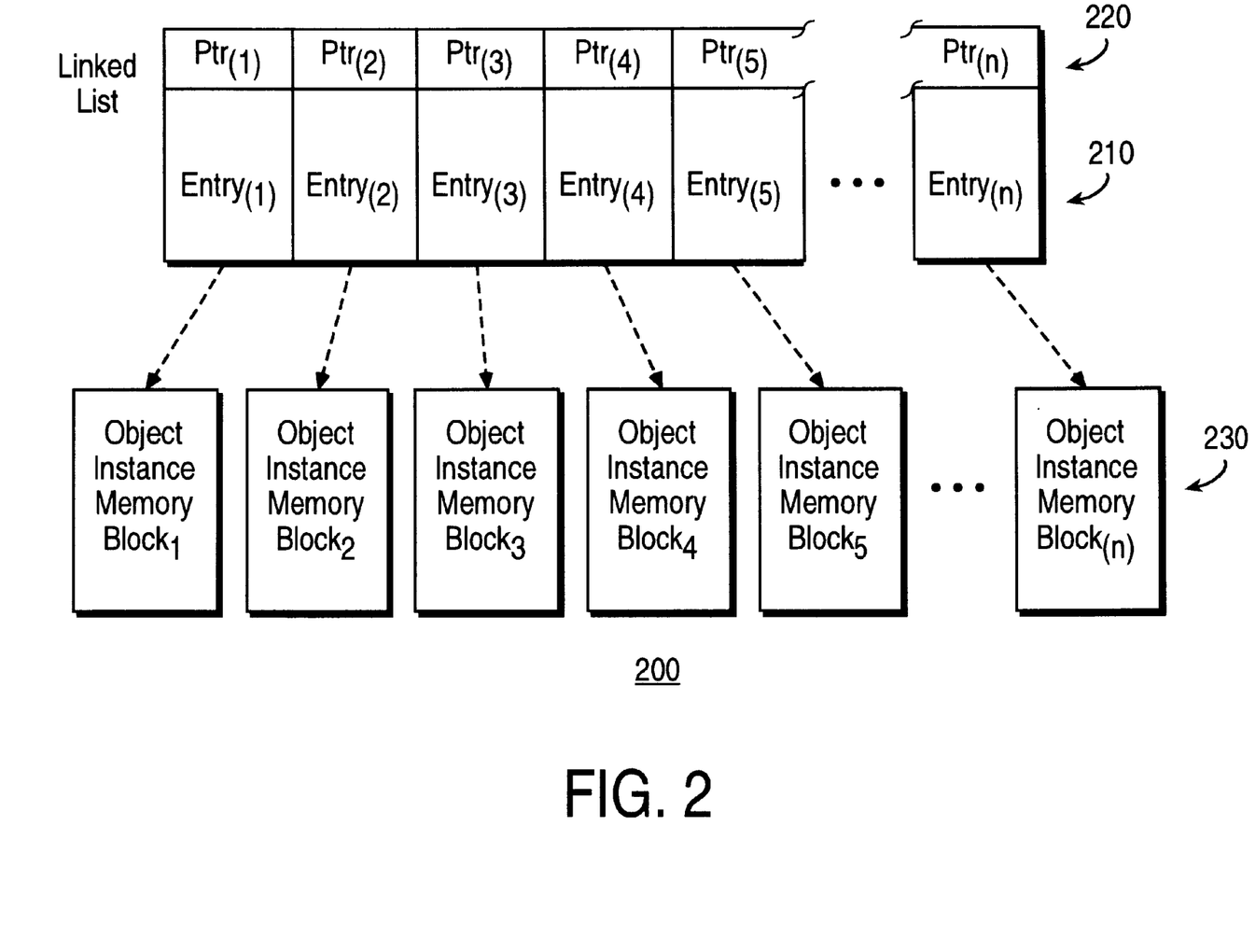
FIG. 2 illustrates one embodiment for an object instance pool for use in the object instance memory allocation of the present invention.

FIG. 2 illustrates one embodiment for an object instance pool for use in the object instance memory allocation of the present invention. As shown in FIG. 2, an object instance pool 200 includes a plurality of entries (1–n), labeled 210 on FIG. 2. Each entry (1–n) has a corresponding object instance memory block (1–n), labeled 230. In general, the object instance memory blocks 230 are portions or blocks of heap memory allocated to store members of an instance for the underlying class. For example, if the object instance pool 200 supports an object class "DataText", which comprises, in part, a data member of 2,000 character bytes, then each object instance memory block 230 comprises memory sufficient to store the 2,000 character bytes. The object instance pool 200 shown in FIG. 2 supports allocation of object instances for one class type. However, the object instance memory allocation 150 includes an object instance pool for each reusable class type.

In operation, the object instance pool 200 includes logic to allocate and deallocate object instance memory blocks 230. For example, to create an object instance, the object instance pool 200 may allocate $entry_1$ (i.e., object instance $memory block_1$) for the first request. For a second request to instantiate an object instance, the object instance pool 200 may allocate object instance $memory block_2$. Upon release of the object instance allocated to object instance $memory block_1$, the object instance pool 200 "de-allocates" object instance memory block, to permit a new allocation of object instance $memory block_1$. If memory blocks are not available, a request is made to either a dynamic memory allocator (e.g., system memory allocation manager 120) or an operating system heap manager (e.g., operating system 110).

In one embodiment, entries 210 for the object instance pool 200 include a linked list of pointers (1–n) 220. As shown in FIG. 2, each pointer ($ptr_1$–$ptr_n$) for an object instance entry points to a corresponding object instance memory block in the heap memory. For example, $ptr_1$ of $entry_1$ points to object instance $memory block_1$. The pointers are configured in a linked list in order to facilitate searching of null or empty entries in the object instance pool 200. In one embodiment, each pointer ($ptr_1$–$ptr_n$) 220 is a four byte pointer.

In one embodiment, the object instance pool 200 allocates entries by searching the corresponding pointers ($ptr_1$–$ptr_n$) 220 in the entries 210. Specifically, the object instance memory allocation 150 (FIG. 1) searches the pointers ($ptr_1$–$ptr_n$) 220 to find a pointer that is not null (i.e., the pointer (ptr) 220 points to an associated object instance memory block 230). If the pointer 220 is null, then the corresponding entry has been allocated to store an active object instance. Alternatively, if the pointer is not null, then that entry has not been allocated or has been re-allocated to the object instance pool (i.e., the entry is available). In the preferred embodiment, the searching for a non-null pointer is facilitated through the linked list of pointers 220.

Figure 3:
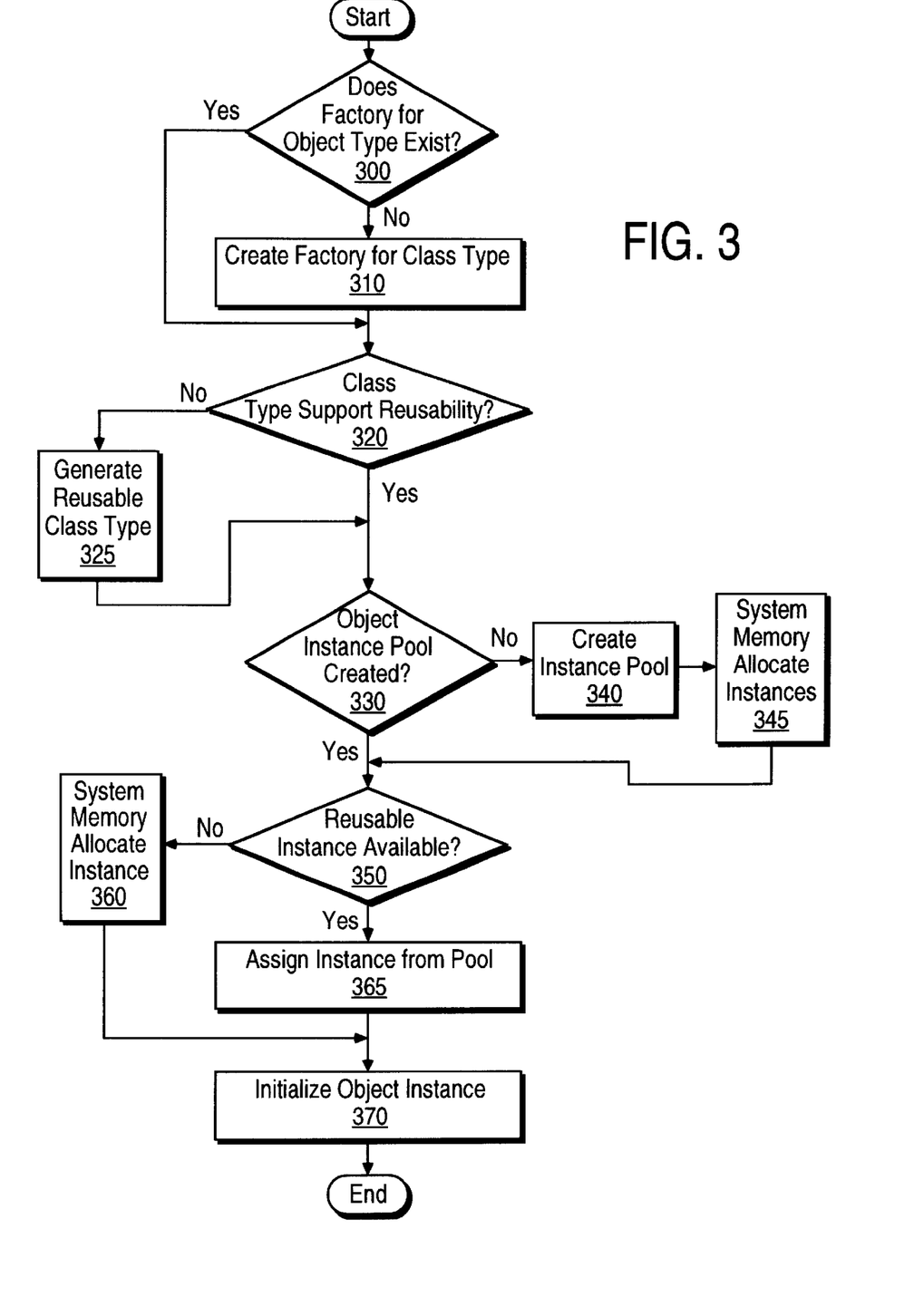
FIG. 3 is a flow diagram illustrating one embodiment for creating an object in accordance with object instance memory allocation of the present invention.

FIG. 3 is a flow diagram illustrating one embodiment for creating an object in accordance with object instance memory allocation of the present invention. The process is initiated upon a request to create an object from an existing object class. As shown in block 300, the process determines whether the corresponding object type has an object instantiation mechanism (e.g., an object factory). If the class type does not include an object factory, then an object factory is created for the class type as shown in block 310. As is well known in object-oriented programming, an object factory is an object class that includes the functionality to generate instances of the super class type the object factory supports. If the object factory does not exist, or a new object factory has been created, then the process determines whether the class type supports reusability as shown in decision block 320. If the class type does not support reusability, then the process generates a reusable class type as shown in block 325. If the corresponding class type does support reusable classes, or a reusable class type has been created, then the process determines whether an object instance pool has been created as shown in block 330. If no instance pool has been created, then an object instance pool is created for that class type as shown in block 340. An object instance pool is created by generating a request for memory to the dynamic memory allocator or operating system, and receiving a plurality of memory blocks to support the number of object instances specified in the reusable class type mechanism as shown in block 345.

If an object instance pool has been created, then the process determines whether the object instance pool contains an available entry as shown in block 350. If an entry of the object instance pool is available, then an object instance memory block from the object instance pool is assigned for the object S instance being created as shown in block 365. Alternatively, if an object instance memory block is not available from the object instance pool, then a memory request is issued to either a dynamic memory allocator or the operating system to receive a memory block of sufficient size to support the object instance being created as shown in block 360. The object instance is then initialized in accordance with an "initialization method." In general, the initialization method sets parameters, such as counters or default text strings, for operation of the object.

Figure 4:
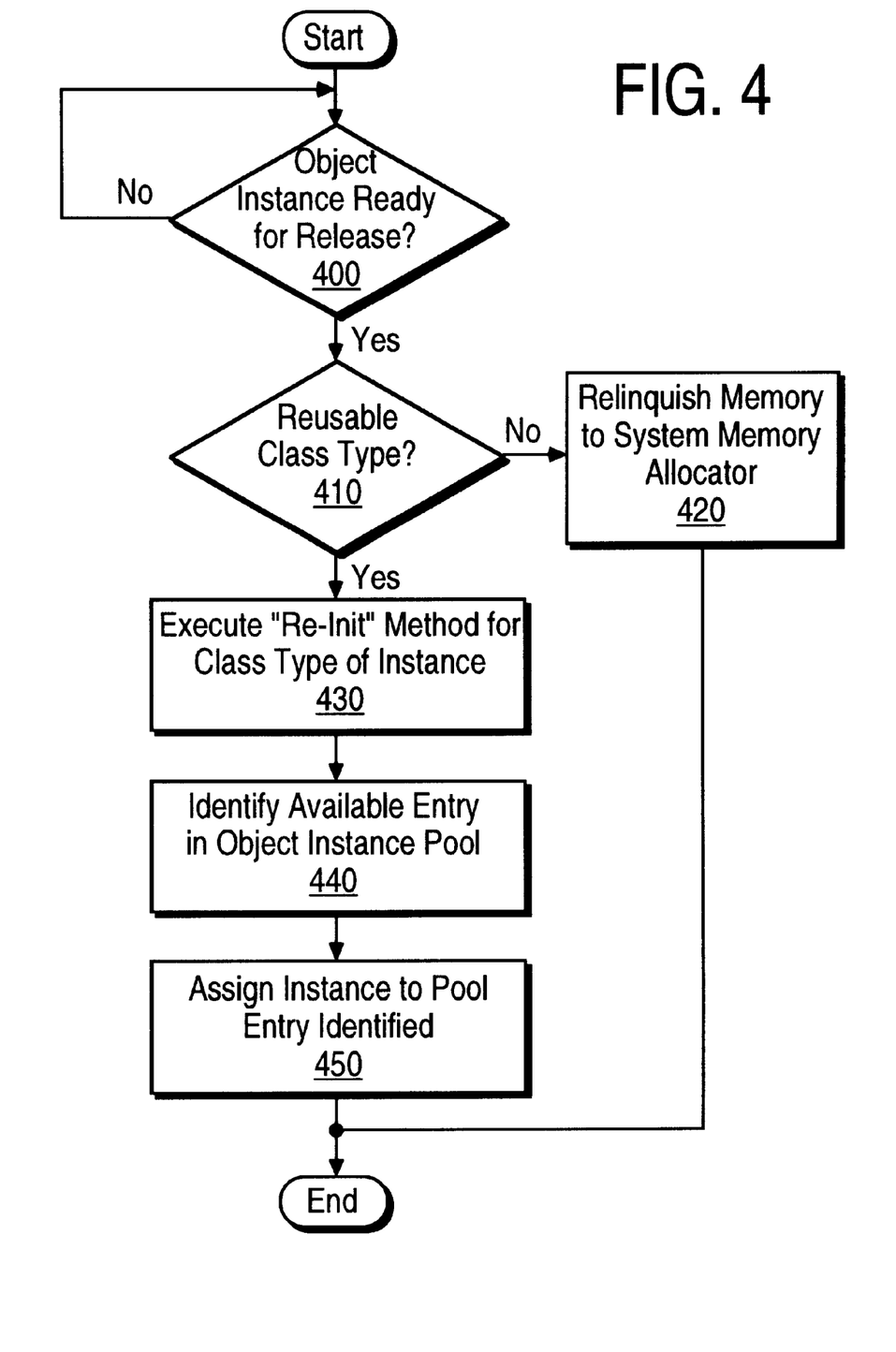
FIG. 4 is a flow diagram illustrating one embodiment for releasing object instances.

FIG. 4 is a flow diagram illustrating one embodiment for releasing object instances. As shown in block 400, the process is initiated when an object instance is ready for release. In one embodiment, the object release process in the object instance memory allocation 150 (FIG. 1) occurs when a release method ( ) is called. Generally, the release method ( ) is called when the object instance is no longer needed. If the software system implements a "garbage collection" scheme, then all object instances marked for garbage collection call the release method ( ) to terminate. Alternatively, if the software system implements a reference counting model (e.g., Component Object Model), then the release method ( ) is called when the reference count is decremented to 0.

Once an object instance is ready for release, then the process determines whether the corresponding class type for the object instance is a reusable class type, as shown in block 410. If the class type is not reusable, then the memory block for the object instance is relinquished to system memory (e.g., a dynamic memory allocator or an operating system heap manager), as shown in block 420. As shown in block 430, if the class type is reusable, then a reinitialization ("re-init") method for the class type is executed on the object instance. Generally, the re-init method initializes the object instance memory block for re-allocation of the memory block to a new object instance for the corresponding class type. For example, the object instance memory block may store numerous attributes set by methods in the corresponding object. In the previous example of the "DataText" object, the object instance memory block may store a string of characters. For this example, the re-init method clears the contents of the data member buffer so that data does not remain in the object instance memory block from its previous use. In one embodiment, a program developer that specifies a reusable class type is required to implement a re-init method for the corresponding class type. Objects released with a software system (e.g., applications) includes the re-init method as reusable class type objects.

As shown in block 440 of FIG. 4, to re-allocate an object instance memory block, the process identifies an available entry in the object instance pool. As discussed above, in one embodiment, the object instance memory allocation 150 searches the object instance pool for a null pointer. If an object instance entry is available, then the process assigns the re-initialized object instance memory block to the object instance pool entry identified as shown in block 450. The object instance memory block is re-allocated by storing its corresponding pointer in the pointer 220 field (FIG. 2) in the identified entry.

An Object-oriented System Implementation:

FIG. 5 is a block diagram illustrating a portion of a distributed object oriented software environment. The object-oriented software system 500 includes object instance memory allocation 560, that incorporates the object-oriented memory allocation techniques of the present invention. The object instance memory allocation 560 generates object instances, depicted as object instances 580 on FIG. 5, for use in the distributed object-oriented software system 500.

The object-oriented software system 500 includes an object factory class 545. In general, the object factory class 545 is used to create object instances. A client object creates an instance for a server object by calling through the I_ClassFactory interface to the CreateObject method. The use of the object factory class provides a consistent programming model in that a programmer is not required to remember the names of specific creation methods. The object factory class 545 is an object class. As shown in FIG. 5, the object factory class 545 includes the create object method. The create object method is coupled to the object instance memory allocation 560 to generate object instances in accordance with techniques of the present invention.

The object-oriented software system 500 includes an object factory class 545. In general, the object factory class 545 is used to create object instances. A client object creates an instance for a server object by calling through the I_ClassFactory interface to the CreateObject method. The use of the object factory class provides a consistent programming model in that a programmer is not required to remember the names of specific creation methods. The object factory class 545 is an object class. As shown in FIG. 5, the object factory class 545 includes the create object method. The create object method is coupled to the object instance memory allocation 560 to generate object instances in accordance with techniques of the present invention.

The object oriented software environment 500 includes an interface definition language compiler (IDL) 510 to permit a user to specify interfaces for objects for use in the object oriented environment. As shown on the input to the IDL compiler 510, in addition to generating interfaces, the IDL compiler 510 compiles user specified reusable classes for use in the object oriented environment. In one embodiment, the user specifies in the code a number as a parameter for the reusable class. The following declaration illustrates a user specified reusable class:

DataText: resuable (20);

The reusable class parameter specifies the number of object instance memory blocks in the object instance pool (FIG. 2). For the above example declaration, the user specifies twenty (20) object instance memory blocks for the reusable class "DataText." In one embodiment, the IDL compiler 510 generates a flag to indicate that a class is a reusable class. The reusable class flag is used in the object instance memory allocation processing, described above (FIGS. 3 and 4), to indicate the existence of a reusable class.

For the object-oriented embodiment disclosed in FIG. 5, several processes are executed to support object life cycle management. A constructor method 520 exists for each class type in the object-oriented software system. The constructor method 520, defined by the IDL compiler 510 from each class type, is derived from a base object of the object-oriented software system (e.g., C_Object), and exposes an interface with two attributes (e.g., ID and name). For example, the class "CCustomer", derived from the object C_Object, exposes an interface "ICustomer" with attributes "Id" and "Name." The constructor method 520 calls an initializer 530 that initializes an instance for the class type. The following declaration illustrates a constructor technique for the example class "CCustomer."

| CCustomer::Customer(IUnknown * pOuter): | C_Object(pOuter), M_Id(0), M_Name() CTOR_CCustomer |
|---|---|
| { } | |

The constructor also calls a CTOR_macro. In general, the CTOR_macro initializes pointers generated by a Make-TYPE function. These pointers are initialized in the constructor method for the C++ class. The CTOR_macro may be used as a prefix to the class name in the member initialization list, as shown in the following example.

| CCustomer::CCustomer(IUnknown* pOuter): | C_Object(pOuter) CTOR_CCustomer |
|---|---|
| { } | |

In one embodiment, the constructor 520 uses a member initialization list. A member initialization list is a C ++ feature that assigns values to data members of an object. The following is an example of a constructor that uses a member initialization list.

| Ccustomer::Ccustomer(): | m_Id(0), M_Name(); |
|---|---|
| { } | |

In the proceeding code example, the construct, M_Id(0), assigns a value of 0 to the data member, m_Id. The use of a member initialization list is more efficient than assigning values manually through the implementation of the constructor method 520.

The object-oriented software system 500 also includes a mechanism for tracking the generation and release of objects, denoted as life cycle management 535. For this embodiment, the life cycle management 535 supports a reference counting model. To this end, the life cycle management 535 includes a AddRef( ) method and a Release( ) method. For purposes of nomenclature, an object, known as a client object, calls a method on another object, known as a server object. An object may provide interface pointers to many client objects at the same time. Because client objects are not aware of other client objects, a client object cannot merely delete the server object when the use of the server object has ended. Instead, the server object remains active as long as one client object maintains its interface pointer.

A specification underlying the operation between the client and the server object includes a mechanism for reference counting. The reference counting increments the reference count for a server object when an interface pointer for that object is issued. When the client object finishes using the interface, the reference count is decremented. When all reference counts for all a server's interfaces are zero, then the server object instance may be released. A reference count for an object instance is zero when a destructor method (destructor 540) for that object is called. Thus, for this embodiment, the object does not call interface methods from the destructor method 540. Instead, the destructor method 540 calls the "detach object" method 555 in the object factory class 545. Each call to the detach object 555 decrements the reference count for the object instance. When the reference count for an object instance is one, an "OnFinalRelease" method is executed to perform general clean up tasks prior to decrementing the reference counter one final time, and calling the destructor method 540 to subsequently release the instance to the object instance pool (200) in the object instance memory allocation 560.

The following example illustrates the flow for creation and destruction of objects for an example customer object.

//1. Call CreateObject to create an instance.
  TheCustomer→PlaceOrder(1001, 100);
//2. Use the instance
  TheCustomer→PlaceOrder(1001, 100);
//3. Call Detach when you finish using the instance.
  theCustomer.Detach( )

Each class type in the object-oriented software system 500 includes an implementation for a destructor method 540. An object cannot call interface methods in its destructor that causes an AddRef( ) and subsequent Release(). Otherwise, the potential for the client object to delete the server object out from under another client object exists.

The object-oriented software system supports a distributed object environment. A running object table (ROT) 570 includes, for each type, a tree to uniquely identify all instances active in the object-oriented software system. As shown in FIG. 5, the ROT 570 includes a node for the class type, a node for the factory class, and branch nodes for each instance of that class type. Specifically, the ROT 570 specifies a global object identifier and a corresponding pointer for the object to permit integration of objects in a distribute object environment.

Figure 6:
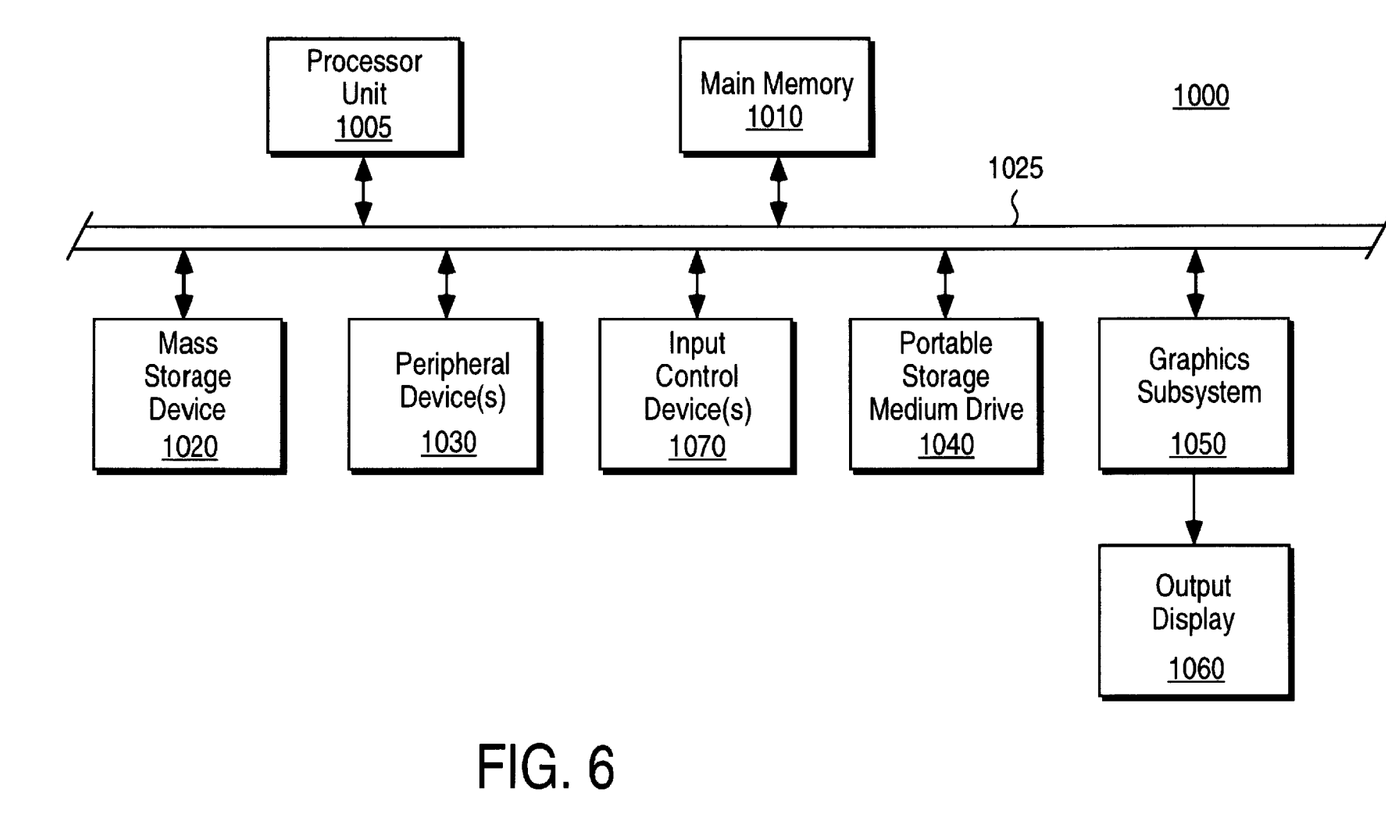
FIG. 6 illustrates a high level block diagram of a general purpose computer system in which the object oriented software system of the present invention may be implemented.

Computer System:

FIG. 6 illustrates a high level block diagram of a general purpose computer system in which the object oriented software system of the present invention may be implemented. A computer system 1000 contains a processor unit 1005, main memory 1010, and an interconnect bus 1025. The processor unit 1005 may contain a single microprocessor, or may contain a plurality of microprocessors for configuring the computer system 1000 as a multi-processor system. The main memory 1010 stores, in part, instructions and data for execution by the processor unit 1005. If the object instance memory allocation of the present invention is wholly or partially implemented in software, the main memory 1010 stores the executable code when in operation. The main memory 1010 may include banks of dynamic random access memory (DRAM) as well as high speed cache memory.

The computer system 1000 further includes a mass storage device 1020, peripheral device(s) 1030, portable storage medium drive(s) 1040, input control device(s) 1070, a graphics subsystem 1050, and an output display 1060. For purposes of simplicity, all components in the computer system 1000 are shown in FIG. 6 as being connected via the bus 1025. However, the computer system 1000 may be connected through one or more data transport means. For example, the processor unit 1005 and the main memory 1010 may be connected via a local microprocessor bus, and the mass storage device 1020, peripheral device(s) 1030, portable storage medium drive(s) 1040, graphics subsystem 1050 may be connected via one or more input/output (I/O) busses. The mass storage device 1020, which may be implemented with a magnetic disk drive or an optical disk drive, is a non-volatile storage device for storing data and instructions for use by the processor unit 1005. In the software embodiment, the mass storage device 1020 stores the object oriented software system software for loading to the main memory 1010.

The portable storage medium drive 1040 operates in conjunction with a portable non-volatile storage medium, such as a floppy disk or a compact disc read only memory (CD-ROM), to input and output data and code to and from the computer system 1000. In one embodiment, the object instance memory allocation software is stored on such a portable medium, and is input to the computer system 1000 via the portable storage medium drive 1040. The peripheral device(s) 1030 may include any type of computer support device, such as an input/output (I/O) interface, to add additional functionality to the computer system 1000. For example, the peripheral device(s) 1030 may include a network interface card for interfacing the computer system 1000 to a network. For the software implementation, objects may be input to the computer system 1000 via a portable storage medium or a network for processing by the object oriented software system.

The input control device(s) 1070 provide a portion of the user interface for a user of the computer system 1000. The input control device(s) 1070 may include an alphanumeric keypad for inputting alphanumeric and other key information, a cursor control device, such as a mouse, a trackball, stylus, or cursor direction keys. In order to display textual and graphical information, the computer system 1000 contains the graphics subsystem 1050 and the output display 1060. The output display 1060 may include a cathode ray tube (CRT) display or liquid crystal display (LCD). The graphics subsystem 1050 receives textual and graphical information, and processes the information for output to the output display 1060. The components contained in the computer system 1000 are those typically found in general purpose computer systems, and in fact, these components are intended to represent a broad category of such computer components that are well known in the art.

The object instance memory allocation techniques may be implemented in either hardware or software. For the software implementation, the object instance memory allocation is software that includes a plurality of computer executable instructions for implementation on a general purpose computer system. Prior to loading into a general purpose computer system, the object instance memory allocation software may reside as encoded information on a computer readable medium, such as a magnetic floppy disk, magnetic tape, and compact disc read only memory (CD-ROM). In one hardware implementation, the object instance memory allocation may comprise a dedicated processor including processor instructions for performing the functions described herein. Circuits may also be developed to perform the functions described herein.

Although the present invention has been described in terms of specific exemplary embodiments, it will be appreciated that various modifications and alterations might be made by those skilled in the art without departing from the spirit and scope of the invention.

What is claimed is:

1. A method for allocating blocks of memory in an object oriented software system, said method comprising the steps of:

allocating memory from an operating system to an application program;

assigning, from said application program, a plurality of memory blocks, using said memory allocated from said operating system, to generate an object instance pool for an object class, each of said memory blocks comprising a memory size appropriate for instantiation of an object instance from said object class;

instantiating an object instance of said object class by assigning one of said memory blocks from said object instance pool for said object class for use by said object instance;

re-assigning memory blocks from object instances of said object class into said object instance pool for said object class when said object instances are no longer required in said application program; and re-initializing an object instance from said application program prior to re-assigning a memory block for an object instance into said object instance pool.

2. The method as set forth in claim 1, wherein the step of re-assigning memory blocks of object instances when said object instances are no longer required comprises the step of re-assigning memory blocks from object instances when said object instances are garbage collected by said application program.

3. The method as set forth in claim 2, wherein the step of re-assigning memory blocks of object instances in said object instance pool when said object instances are garbage collected comprises the step of re-assigning memory blocks of object instances when a release() method is called, so that said re-assignment of memory blocks of object instances is compatible with services utilizing a Component Object Model (COM).

4. The method as set forth in claim 1, further comprising the step of providing a means to permit a user to designate an object class as a reusable object class, wherein said reusable object class permits reuse of memory blocks allocated to application programs for said object instance pool from said operating system.

5. The method as set forth in claim 4, wherein providing a means to permit a user to designate an object class as a reusable object class comprises the step of providing a means to permit a user to designate the number of memory blocks associated with said object instance pool.

6. A method for allocating blocks of memory in an object oriented software system, said method comprising the steps of:

allocating memory from an operating system to an application program;

instantiating object instances for an object class from an object factory in said application program;

receiving a request to generate an instance of said object class at said object factory;

generating, from said object factory, an object instance pool for an object class, wherein said object instance pool comprises a plurality of memory blocks assigned from said memory allocated from said operating system to said application program, each of said memory blocks comprising a memory size appropriate for instantiation of an object instance from said object factory;

allocating, from said object instance pool, a memory block to instantiate said object instance; and releasing memory blocks from object instances of said object class into said object instance pool when said object instances are no longer required for use in said application program.

7. The method as set forth in claim 6, further comprising the step of re-initializing an object instance from said application program prior to re-assigning a memory block for an object instance into said object instance pool.

8. The method as set forth in claim 6, further comprising the step of providing a means to permit a user to designate an object class as a reusable object class, wherein said reusable object class permits reuse of memory blocks allocated to application programs for said object instance pool from said operating system.

9. The method as set forth in claim 8, wherein providing a means to permit a user to designate an object class as a reusable object class comprises the step of providing a means to permit a user to designate the number of memory blocks associated with said object instance pool.

10. The method as set forth in claim 6, wherein the step of releasing memory blocks from object instances of said object class into said object instance pool when said object instances are no longer required comprises the step of releasing memory blocks from object instances when said object instances are garbage collected by said application program.

11. The method as set forth in claim 10, wherein the step of releasing memory blocks of object instances in said object instance pool when said object instances are garbage collected comprises the step of releasing memory blocks of object instances when a release() method is called, so that said re-assignment of memory blocks of object instances is compatible with services utilizing a Component Object Model (COM).

12. A computer readable medium comprising a set of instructions stored therein, which when executed by a computer, causes the computer to perform the steps of:

allocating memory from an operating system to an application program;

instantiating object instances for an object class from an object factory in said application program;

receiving a request to generate an instance of said object class at said object factory; generating, from said object factory, an object instance pool for an object class, wherein said object instance pool comprises a plurality of memory blocks assigned from said memory allocated from said operating system to said application program, each of said memory blocks comprising a memory size appropriate for instantiation of an object instance from said object factory;

allocating, from said object instance pool, a memory block to instantiate said object instance; and releasing memory blocks from object instances of said object class into said object instance pool when said object instances are no longer required for use in said application program.

13. The computer readable medium as set forth in claim 12, further comprising the step of re-initializing an object instance from said application program prior to re-assigning a memory block for an object instance into said object instance pool.

14. The computer readable medium as set forth in claim 12, further comprising the step of providing a means to permit a user to designate an object class as a reusable object class, wherein said reusable object class permits reuse of memory blocks allocated to application programs for said object instance pool from said operating system.

15. The computer readable medium as set forth in claim 14, wherein providing a means to permit a user to designate an object class as a reusable object class comprises the step of providing a means to permit a user to designate the number of memory blocks associated with said object instance pool.

16. The computer readable medium as set forth in claim 12, wherein the step of releasing memory blocks from object instances of said object class into said object instance pool when said object instances are no longer required comprises the step of releasing memory blocks from object instances when said object instances are garbage collected by said application program.

17. The computer readable medium as set forth in claim 16, wherein the step of releasing memory blocks of object instances in said object instance pool when said object instances are garbage collected comprises the step of releasing memory blocks of object instances when a release() method is called, so that said re-assignment of memory blocks of object instances is compatible with services utilizing a Component Object Model (COM).

* * * * *